United States Patent
Peterson et al.

(10) Patent No.: US 9,245,870 B1
(45) Date of Patent: Jan. 26, 2016

(54) SYSTEMS AND METHODS FOR PROVIDING DATA CHANNELS AT A DIE-TO-DIE INTERFACE

(71) Applicant: QUALCOMM Incorporated, San Diego, CA (US)

(72) Inventors: LuVerne Ray Peterson, San Diego, CA (US); Thomas Clark Bryan, San Diego, CA (US); Alvin Leng Sun Loke, San Diego, CA (US); Tin Tin Wee, San Diego, CA (US); Gregory Francis Lynch, San Diego, CA (US); Stephen Robert Knol, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/516,763

(22) Filed: Oct. 17, 2014

(51) Int. Cl.
  *H01L 25/00* (2006.01)
  *H01L 25/065* (2006.01)
(52) U.S. Cl.
  CPC .................................. *H01L 25/065* (2013.01)
(58) Field of Classification Search
  CPC ................. G06F 15/7896; H01L 2224/32137; H01L 25/0655
  See application file for complete search history.

(56) References Cited

U.S. PATENT DOCUMENTS

| | | | |
|---|---|---|---|
| 8,418,115 B1 | 4/2013 | Tom et al. | |
| 2004/0098694 A1* | 5/2004 | Teig | G06F 17/5077 716/129 |
| 2004/0188818 A1* | 9/2004 | Wang | H01L 21/565 257/685 |
| 2007/0182601 A1 | 8/2007 | Ueno | |
| 2013/0009324 A1 | 1/2013 | Bartley et al. | |
| 2013/0015586 A1 | 1/2013 | Crisp et al. | |
| 2013/0318266 A1 | 11/2013 | Thomas et al. | |

* cited by examiner

*Primary Examiner* — Jeffrey Zweizig
(74) *Attorney, Agent, or Firm* — Haynes and Boone LLP

(57) ABSTRACT

A circuit includes a first die having a first array of exposed data nodes, and a second die having a second array of exposed data nodes, wherein a given data node of the first array corresponds to a respective data node on the second array, further wherein the first array and the second array share a spatial arrangement of the data nodes, wherein the first die has data inputs and sequential logic circuits for each of the data nodes of the first array on a first side of the first array, and wherein the second die has data outputs and sequential logic circuits for each of the data nodes of the second array on a second side of the second array, the first and second sides being different.

30 Claims, 7 Drawing Sheets

SYSTEMS AND METHODS FOR PROVIDING DATA CHANNELS AT A DIE-TO-DIE INTERFACE

TECHNICAL FIELD

This application relates to die-to-die interfaces and, more particularly, to systems and methods for providing data channels at die-to-die interfaces.

BACKGROUND

Packaged systems incorporating multiple die are receiving growing interest. Multi-die packages use die-to-die links to enable communication between die. A die-to-die link must typically support very large aggregate data bandwidth and favors a forwarded-clock parallel bus architecture given the connectivity density enabled by new advanced package technologies.

Some conventional systems include an architecture in which each die has a number of externally-exposed contacts (e.g., vias) that are used for data contacts. At least one other externally-exposed contact on each die would be used for a clock signal. Each of the data contacts is associated with some kind of sequential logic circuit, for example, a flip flop that either captures transmitted data or transmits stored data. On a transmit side, the clock is provided at the externally-exposed clock node and then transferred die to die to a receive-side clock node on the other die.

Such conventional architecture may include placing flip-flops directly underneath or in the very near vicinity of their respective contacts. The flip-flops are then clocked by a clock tree at each die. The externally-exposed contacts are arranged in an array that may cover a relatively large surface area of each die. Thus, the clock trees may be relatively large because they each distribute the clock over an area consistent with the size of its respective array of contacts. In other words, in such prior art systems, the sequential logic circuits are not localized, but are rather distributed over the area of the array of contacts.

However, the clock trees in systems including distributed flip-flops may require using longer metal traces for some bits, thereby increasing the total amount of metal and capacitance, hence power consumption, in the clock tree as a whole. There is thus a need in the art for improved die-to-die interfaces.

SUMMARY

Circuits for die-to-die interfaces are provided. Various embodiments localize the die-to-die circuitry thereby allowing smaller clock trees (shorter clock routes, lower clock power, etc.) and then distribute or "fan-out" the circuit outputs to the contacts which are more spatially separated on a transmit-side array. On the receive-side, such embodiments collect the signals from the spatially separated contacts on the receiver side die to another localized area, i.e., "fan-in" the signals, in such a way that the sum of the fan-out and fan-in route lengths are substantially the same for each of the data bits.

In one example, a multi-die package includes at least two die. The first die and the second die share a physical layout of their data nodes so that the first die includes an array of data nodes exposed on a surface of the die, and the second die also includes an array of data nodes exposed on its surface. A given data node on the first die corresponds to a particular data node on the second die, and those two data nodes that correspond to each other are similarly spatially placed within their arrays. Put another way, in this example, the array of data nodes on the first die is arranged as if the array of data nodes on the second die had been spatially translated from the second die to the first die.

Each of the data nodes is served by a data input and sequential logic (e.g., a flip-flop), so that each data node corresponds to a bit. The first die disposes data inputs and sequential logic circuits for each of the bits on a first side of a die-to-die subsystem of the first die, and the second die disposes data outputs and sequential logic circuits for each of the bits on a second side of a die-to-die subsystem of the second die, the first and second sides being different (for example, right versus left).

In another aspect, a data path for each data bit extends from a respective first flip-flop over a first conductor to a respective first node on the first die and from a respective second node on the second die over a second conductor to a respective second flip-flop, where the sum of the lengths of the first conductor and the second conductor is the same for each of the data bits. Another part of the data path for a given bit is a die-to-die data channel, which conducts the data bit from the data node on the first die to a corresponding data node on the second die. The die-to-die data channels for each of the bits are the same, or substantially the same, length.

Therefore, a given data bit may experience a short on-die route from its flip-flop to its data node on the first die, and that short route is compensated by a long route on the second die, where the route on the second die includes a distance from the data node to the corresponding flip-flop. Similarly another data bit may experience a long on-die route on the first die, which is compensated by a short on-die route on the second die. Nevertheless, the data bits have approximately the same sum of a first die data route length and a second die data route length, thereby providing substantially similar data routes for each of the bits at the die-to-die interface.

Further in this example, a clock signal is transmitted from the first die to the second die. The clock signal traverses a route that is similar in length to that of each of the data bits.

Various embodiments provide one or more advantages over conventional solutions. For instance, a clock tree on a die may be designed to be relatively small, since it feeds flip-flops on one side of the die-to-die subsystem die. By contrast, some conventional systems use clock trees which distribute the clock over an area defined by the array of data nodes.

DETAILED DESCRIPTION

Example Circuit Embodiments

In order to reduce metal and capacitance of the clock trees, while still providing adequate setup and hold times, various embodiments provide an architecture wherein sequential logic circuits for data bits are placed along one side of the die-to-die interface sub-system in one die and fed by the clock tree of that die. Another die-to-die interface sub-system in the other die of the multi-die package has its sequential logic circuits for the data bits placed along one side as well, but it is a different side than on the first die. In one example, each of the different die in the multi-die package have a same spatial arrangement of data nodes on the two die, where the data nodes are fed by the sequential logic circuits. Physical data paths for each bit can be arranged so that the various bits each experience a similar delay for the sequential logic circuits of one die to the sequential logic circuits of the other die.

Figure 1:
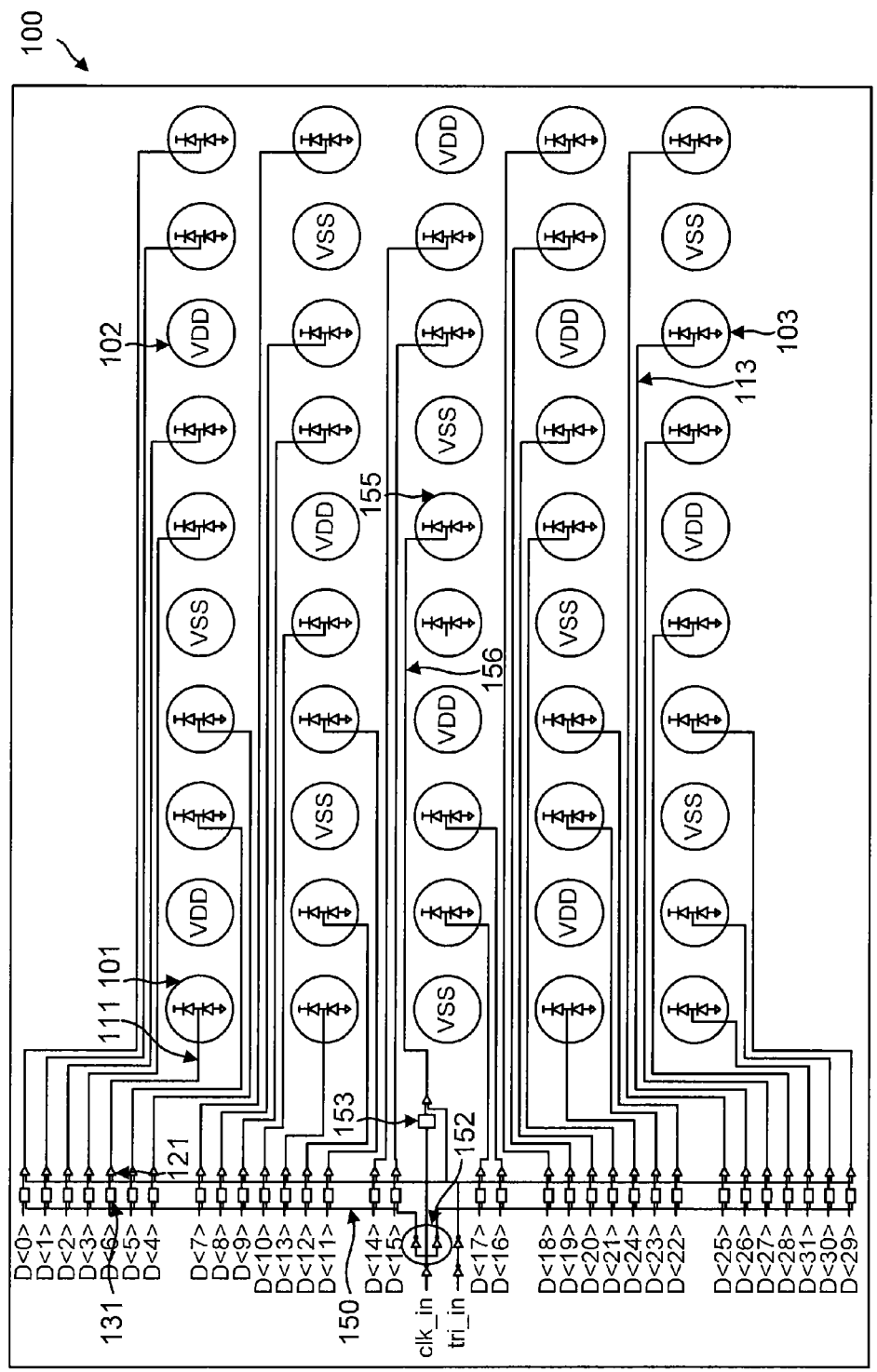
FIG. 1 is an illustration showing a first die having a circuit layout according to one embodiment
Figure 2:
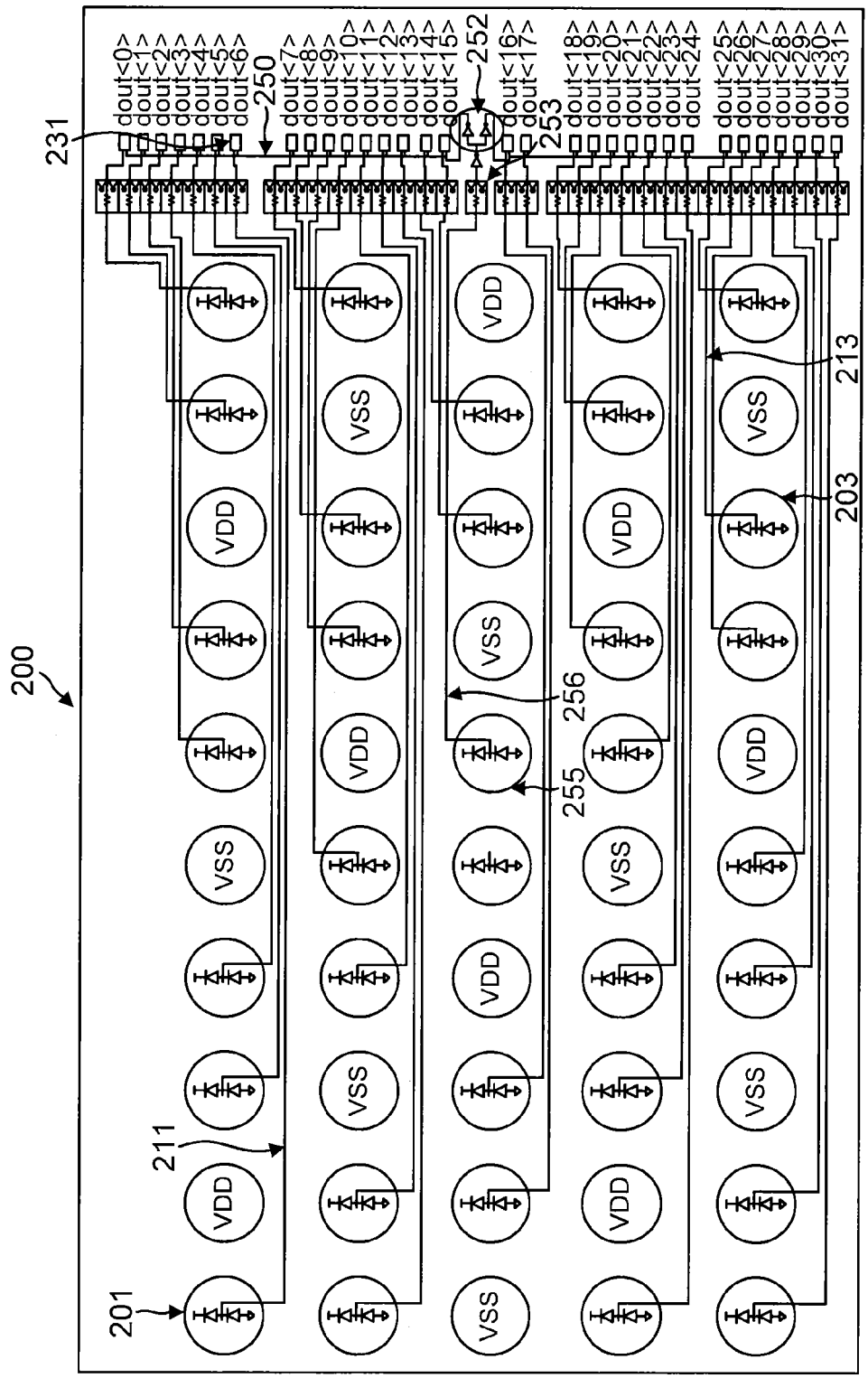
FIG. 2 is an illustration showing a second die having a circuit layout, according to one embodiment.
Figure 4:
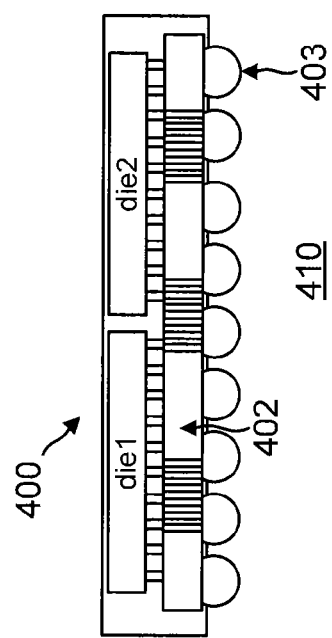
FIG. 4 shows one example multi-die package adapted according to one embodiment.
Figure 4:
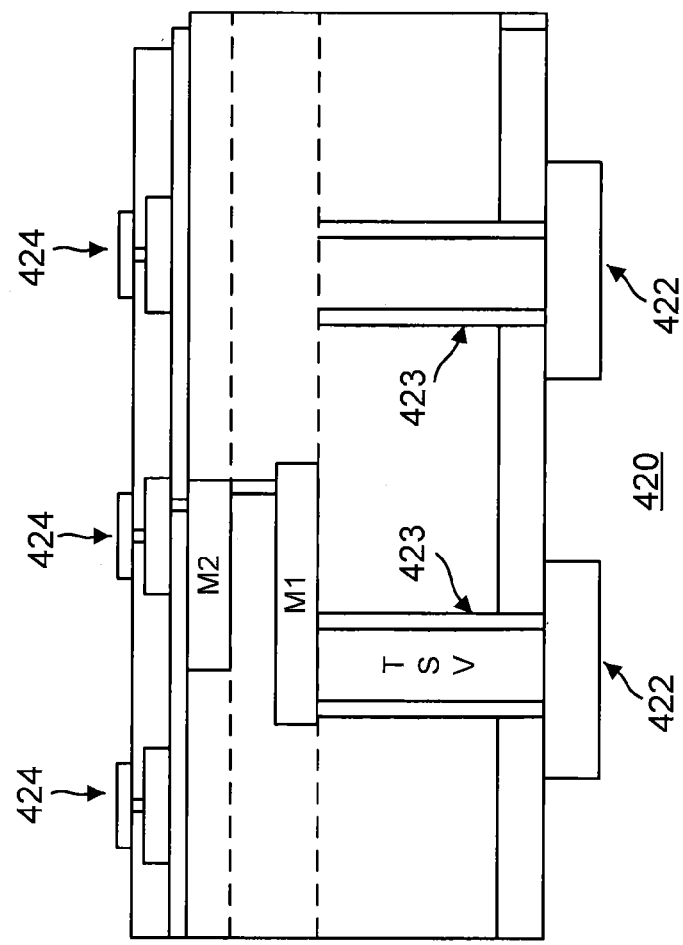
Figure 5:
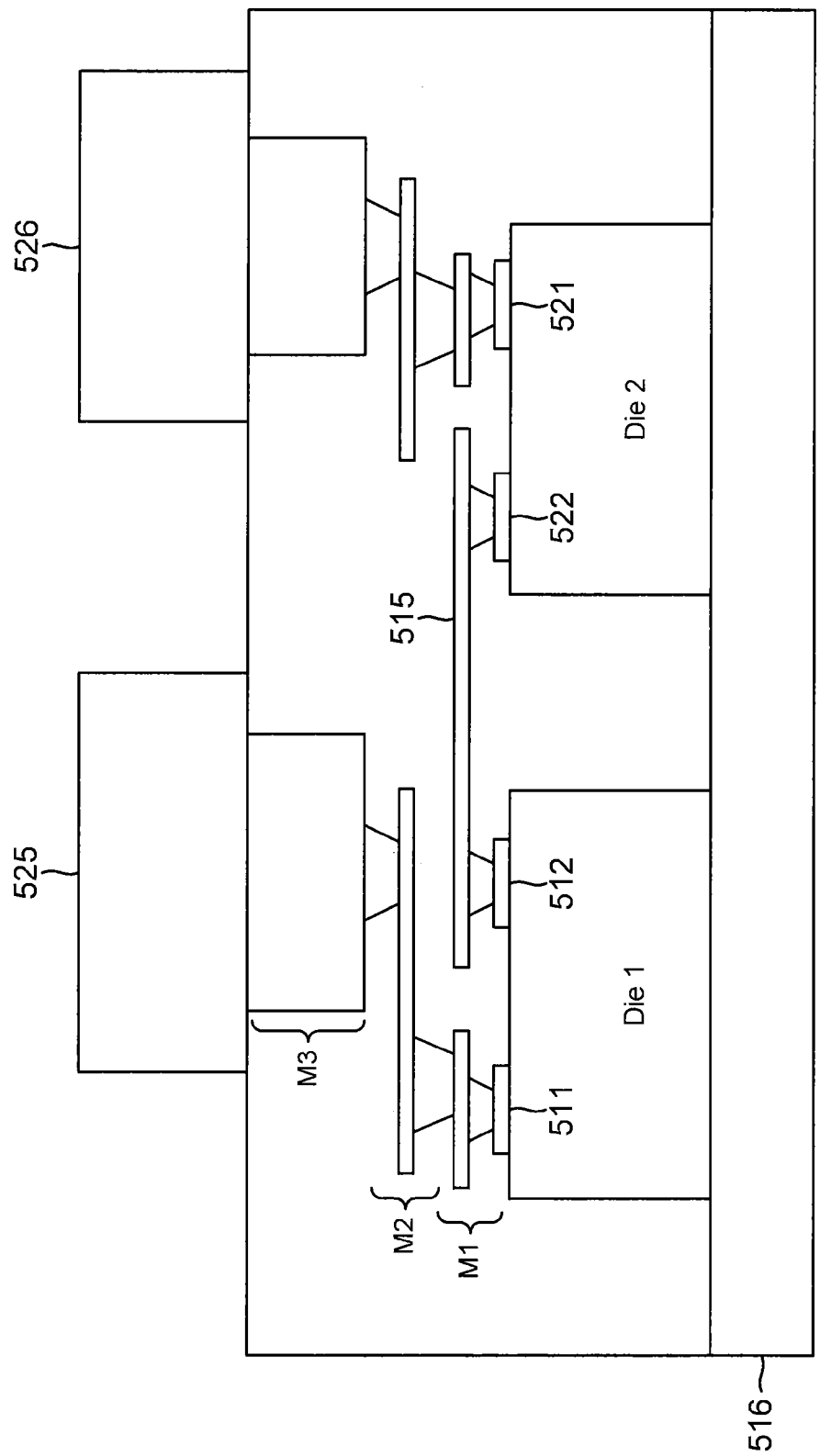
FIG. 5 is an illustration another example multi-die package, adapted according to one embodiment.

FIG. 1 is an illustration showing a first die-to-die interface sub-system 100 in one die having an arrangement of data nodes thereon and having sequential logic arranged on one side, according to one embodiment. FIG. 2 is an illustration showing a second die-to-die interface sub-system 200 in one die having an arrangement of data nodes thereon and having sequential logic arranged on one side, according to this embodiment. The die corresponding to FIGS. 1 and 2 may be arranged in a multi-die package in some embodiments. For convenience, first die-to-die subsystem 100 and second die-to-die subsystem 200 are shown separately in different figures, but it is understood that first die-to-die subsystem 100 illustrates a transmit-side embodiment, and second die-to-die subsystem 200 illustrates a receive-side embodiment, where the two die-to-die subsystems 100 and 200 would be connected at a die-to-die interface in a multi-die package. Example multi-die packages are shown at FIGS. 4 and 5, as described below.

Focusing on FIG. 1, die-to-die subsystem 100 includes thirty-two data nodes, each one of the data nodes corresponding to a bit of parallel data. Data node 101 is one example data node out of the thirty-two data nodes shown on die-to-die subsystem 100. In this embodiment, data node 101 includes an externally-exposed contact (e.g., a via) on a surface of the die that includes die-to-die subsystem 100, where the externally-exposed contact is represented by a circle. Data node 101 also includes electrostatic discharge (ESD) circuitry, represented here by two diodes. Not all of the nodes of die-to-die subsystem 100 are data nodes, as illustrated by example node 102, which is a power node labeled VDD, and other power nodes are labeled VSS or VDD.

Another example data node is data node 103. Each of the data nodes corresponds to one bit of data of the thirty-two bits (<0:31>). So for example, data node 101 is associated with a data input d<6>, and data node 103 is associated with the data input d<26>. Moving to FIG. 2, data node 201 is associated with the same bit of data that data node 101 is associated with, and is coupled to the data output dout<6>. Similarly, data node 203 is associated with the same bit of data that data node 103 is associated with, and is coupled to the data output dout<26>.

Die-to-die subsystem 100 and die-to-die subsystem 200 share a same arrangement of data nodes. As illustrated in FIGS. 1 and 2, data node 101 is in the top left corner of die-to-die subsystem 100, and data node 201 is in the top left corner of die-to-die subsystem 200. Data nodes 103 and 203 are spatially related in the same way. It is as if the arrangement of data nodes on die-to-die subsystem 100 was translated laterally to die-to-die subsystem 200, so that a given node on die-to-die subsystem 100, having a first spatial relationship within the array of nodes on die-to-die subsystem 100, corresponds to a given node on die-to-die subsystem 200, having the same spatial relationship within the array of nodes on die-to-die subsystem 200.

Also, each bit of data traverses a physical on-die path from its respective sequential logic circuit (in this case, flip-flops) and buffer to its data node. On-die physical data path 111 in this example is a metal trace connecting data node 101 to data driver 121, flip-flop 131, and data input d<6>. Similarly, on-die physical data path 211 connects data node 201 with flip-flop 231 on die-to-die subsystem 200. Each of the data nodes on die-to-die subsystem 100 and 200 includes a corresponding physical on-die data path, such as on-die data path 113 serving data node 103, and on-die data path 213 serving data node 203.

Further in this example, the sequential logic circuits associated with the data nodes of die-to-die subsystems 100 and 200 are placed on a side of the given die-to-die subsystem (or, put another way, along a side of the given array of data nodes). In the example of die-to-die subsystem 100, the sequential logic circuits are shown on a left-hand side thereof, where flip-flop 131 is one example sequential logic circuit, and it is understood that each of the other data bits includes a corresponding flip-flop as well. Thus, in contrast to a system in which sequential logic circuits are located under, or very near, their data nodes, the illustrated embodiment of FIGS. 1 and 2 places those sequential logic circuits to one side of the array of data nodes.

The clock input is illustrated as clk_in in FIG. 1, and the clock is distributed to the sequential logic circuits by transmit clock tree 150. In FIG. 2, receive clock tree 250 distributes the clock to the sequential logic circuits (for example, flip-flop 231). In this example, clock trees 150 and 250 are metal traces or routes that are physically disposed on the die in the pattern shown in FIGS. 1 and 2. On die-to-die subsystem 100, clock tree 150 provides a clock signal to clock node 155 via on-die physical path 156, which is similar to the on-die data paths discussed above. At die-to-die subsystem 200, clock node 255 provides the clock signal to clock tree 250 via on-die physical path 256.

In some examples, the sequential logic circuits and the metal traces that form the clock trees 150 and 250 are much smaller than the data nodes, so that they do not extend vertically above the top row of data nodes or below the bottom row of data nodes. Nevertheless, such embodiments still conform to the concepts described above, where the sequential logic circuits and clock trees are disposed on a side of a respective die-to-die subsystem and an array of data nodes. Such embodiments also conform to the concepts described above, where the total physical data path lengths traveled by each bit from transmit-side to receive-side are substantially uniform. A notable feature of such embodiments is that the clock trees 150 and 250 are much smaller and less capacitive than if those clock trees had been distributed under their respective data node arrays.

Figure 6:
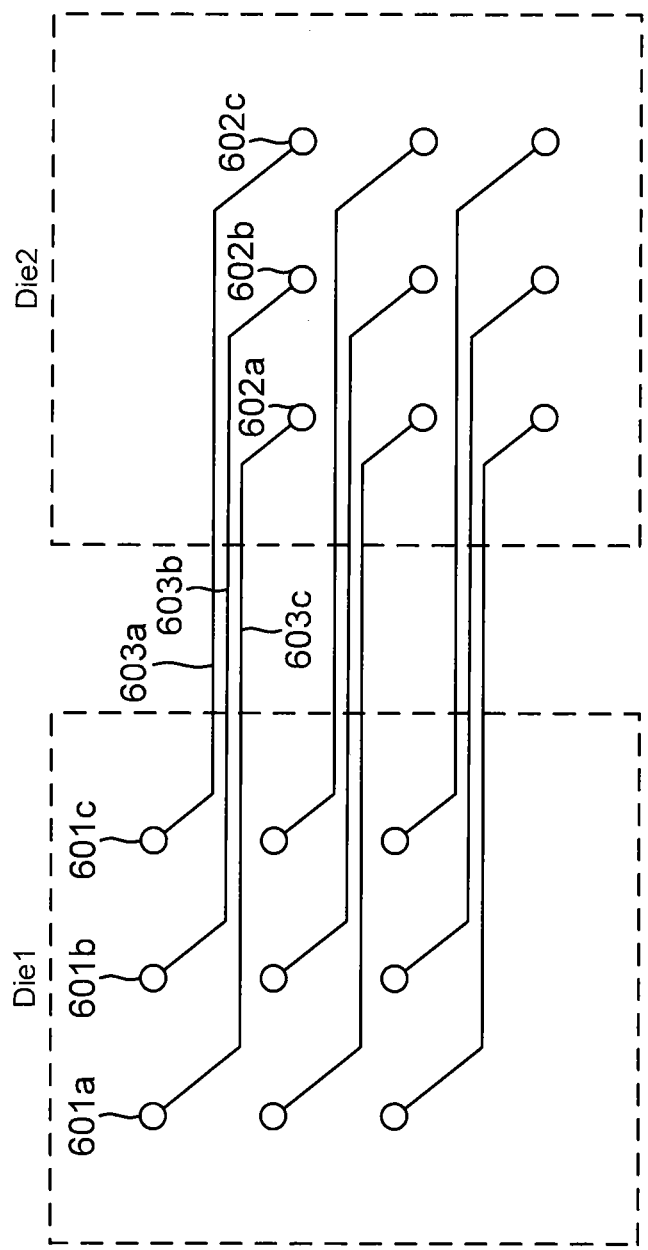
FIG. 6 is an illustration of an example die-to-die interface, adapted according to one embodiment.

FIGS. 1 and 2 do not show die-to-die data channels, but the matching spatial arrangement of the bits on both die allows the use of die-to-die data channels between corresponding bits that are uniform in length. FIG. 6 shows example die-to-die data channels. Also, a die-to-die clock channel (not shown) that forwards the clock from die-to-die subsystem 100 to die-to-die subsystem 200 is the same length as the die-to-die data channels so that any delay and channel capacitance attributable by the die-to-die channels to the data bits is also experienced by the clock as it is forwarded from die-to-die subsystem 100 to die-to-die subsystem 200.

As shown above in FIGS. 1 and 2, each die in the multi-die system includes multiple data nodes (e.g., 101, 103, 201, 203), which are exposed on a surface of the die. A given data node on die-to-die subsystem 100 corresponds to a data node on die-to-die subsystem 200 to transmit and receive a bit of the parallel data. Each pair of data nodes is connected die-to-die by a conductor of length L1, where example die-to-die conductors are shown in FIG. 6.

Focusing on node 101, which is associated with d<6>, it has a short conductor length of physical path 111 from its flip-flop 131 and driver 121. Now moving to die-to-die subsystem 200, the data node 201 is the corresponding node associated with dout<6>. However, node 201 has a long conductor length of physical path 211 to its flip-flop 231. Thus, a short conductor length on die-to-die subsystem 100 for a node is complemented by a long conductor length on die-to-die subsystem 200 for the corresponding data node (and vice versa). As another illustration, node 103 of die-to-die subsystem 100 includes a relatively long conductor path 113, which is complemented by a relatively short conductor path 213 of node 203 at die-to-die subsystem 200.

In this example, the sum of the conductor length on die-to-die subsystem 100 for a node (node 101) and the conductor length on die-to-die subsystem 200 for the corresponding node (201) is referred to as L2 (the sum of the lengths of on-die data channels 111 and 211). For each of the thirty-two pairs of corresponding data nodes, the above-described relationship holds true—the sum of the conductor lengths is L2. FIG. 6 shows the die-to-die data links, and it is understood that they are the same length L1, which may be similar to, or different from, link L2.

In the above example, insertion delay for a clock or data signal is assumed to be proportional to the length of the conductor on which the signal travels. For the system including die-to-die subsystem 100 and die-to-die subsystem 200, each bit of data travels on a path having a length L1+L2 from flip-flop at input (e.g., 130) to flip-flop at output (e.g., 230); therefore, each data bit travels a same length in the multi-die system and has a same propagation delay.

Also of note is the clocking structure of die-to-die subsystems 100 and 200. At die-to-die subsystem 100, the clock is received at clk_in and then is passed through buffers 152 and an adjustable delay element 153 to on-die data path 156 to data node 155. The clock is transmitted to die-to-die subsystem 200 on a conductor (not shown) of length L1, where it is received at node 255 also in the third row, sixth column (the same spatial position as node 155). On die-to-die subsystem 200, the clock signal is passed from node 255 to ESD circuit 253 and buffers 252. Once again, the sum of the conductor lengths on die-to-die subsystem 100 and die-to-die subsystem 200 is L2, so that that total travel for the clock signal from die-to-die subsystem 100 to die-to-die subsystem 200 is L1+L2. Thus, the clock signal travels on a path of a same length as that of the data paths and has a propagation delay the same as that experienced by the data bits. A design feature of the embodiment of FIGS. 1 and 2 is that a sum of L1 and L2 is the same for each of the data bits and for the clock. However, there may be very small differences in L1 among the bits and in L2 among the bits that result from the layouts of the metal traces, where the small differences do not affect setup and hold time considerations.

The spatial array of data nodes on die-to-die subsystem 100 is the same as the spatial array of data nodes on die-to-die subsystem 200. In the present example, die-to-die subsystem 100 includes its clock tree 150 and sequential logic circuits on a left-hand side of the array of data nodes, and die-to-die subsystem 200 includes its clock tree 250 and sequential logic circuits on a right-hand side of its array of data nodes. Die-to-die subsystem 100 and die-to-die subsystem 200 share a right-hand versus left-hand relationship of their respective clock trees and flip-flops, thereby providing complementary lengths for on-die data channels.

An operating example focusing on the data bits and clock signals is instructive. In this example, the clock signal is received at clk_in at die-to-die subsystem 100. The clock signal is passed through buffers 152 and onto clock tree 150. The clock propagates through the clock tree 150, reaching the closest flip-flops first and the furthest flip-flops last, where proximity of a flip-flop to clk_in is defined by the metal length from the clk_in node to the flip-flop. The insertion delay of the clock signal, which is attributable to the clock tree 150, is proportional to the length of the route to that flip-flop within clock tree 150. However, in this example, insertion delay attributable to the clock tree 150 is less than an insertion delay attributable to data signal routing because clock tree 150 has been kept relatively small due to the architecture, which places the flip-flops on one side of the array of data nodes.

When a flip-flop receives the rising edge of the clock, the flip-flop transmits data to a node over an on-die data route. For example, flip-flop 131 receives the clock edge and latches out its data to driver 121, which drives the data signal to data node 101 by way of on-die data route 111. The other flip-flops act similarly in transmitting their data to their corresponding data nodes. Data node 101 is in communication with a die-to-die data channel (not shown), which transmits the data to data node 201 on die-to-die subsystem 200. The data signal that follows on-die data route 211 to flip-flop 231, which latches in the data at the received clock edge. Once again, the other data nodes operate in a similar manner by transferring their respective data bits on die-to-die data channels, where they are received at data nodes on die-to-die subsystem 200 and latched and by receive flip-flops.

Thus in the example above, the data signal traversed on-die data route 111, then die-to-die data channel (not shown), and another on-die data route 211 before being latched at the receive flip-flop 231. However, as noted above, the relatively short length of on-die data route 111 is complemented by a relatively long length of on-die data route 211. The sum of the lengths of on-die data route 111 and on-die data route 211 is the same as the sum of the lengths traversed by the other bits at the other data nodes. In other words, in this example, each of the data bits traverses substantially the same distance from its transmit flip-flop to its receive flip-flop. And since signal delay is proportional to conductor lengths, each of the data bits experience substantially the same delay from transmit flip-flop to receive flip-flop.

The clock signal propagates through adjustable delay element 153 and is transmitted to clock node 155 via on-die route 156 on die-to-die subsystem 100. Clock node 155 is in communication with a die-to-die clock channel (not shown), which is the same length as each of the die-to-die data channels mentioned above. The clock signal propagates along the die-to-die clock channel and reaches clock node 255 on die-to-die subsystem 200. The clock signal then propagates via on-die clock channel 256 through secondary ESD protection device 253 and buffers 252 and then to clock tree 250. The clock signal is distributed to the various receive flip-flops (for example, flip-flop 231) by clock tree 250.

In this example, clock tree 250 has substantially the same architecture as clock tree 150 of die-to-die subsystem 100. Therefore, an insertion delay experienced at receive flip-flop 231, attributable to clock tree 250, is approximately the same as the insertion delay, attributable to clock tree 150, experienced by transmit flip-flop 131. Various embodiments use the same architecture for a transmit clock tree (for example, clock tree 150) as for a receive clock tree (for example, clock tree 250) so that clock insertion delay attributable to the clock trees is substantially the same at a given transmit flip-flop as it is at its corresponding receive flip-flop, thereby ensuring proper setup and hold times. Various embodiments may employ balanced or unbalanced clock trees, as appropriate.

In this example, the clock signal traverses a path that is substantially the same length as the paths traversed by the data bits. In other words, the sum of the lengths of on-die clock routes 156 and 256 is substantially the same as the sum of the lengths of on-die data routes 111 and 211. In this way, the clock signal experiences substantially the same propagation delay from buffers 152 to buffers 252 as do the various data bits from transmit flip-flop to receive flip-flop. Adjustable delay element 153 allows for tuning of the propagation delay of the clock signal to provide appropriate setup and hold times.

Of course, the scope of embodiments is not limited to exact identicality of the trees 150 and 250. In other examples, manufacturing process imperfections and variations may affect the metal routes and also affect the insertion delays in insubstantial ways. Thus, trees 150 and 250 are substantially the same with respect to the metal clock routes to the flip-flops, manufacturing process imperfections and variations notwithstanding.

Furthermore, the scope of embodiments is not limited to exact identicality of the lengths of the on-die data and clock routes, as manufacturing process imperfections and slight variations may affect the lengths of the conductors in those data channels. The same is true for die-to-die channels as well. Variations in length that do not affect setup and hold time considerations result in physical paths that are substantially the same for performance purposes in various embodiments.

The example clock trees of FIGS. 1 and 2 include less metal length than does a conventional "H" clock tree. Less metal provides for less capacitance and, thus, less power dissipation. Furthermore, the die-to-die data channels and clock channel may be manufactured to be relatively short in length, especially in scenarios where both the die are designed together. Shorter die-to-die data channels and clock channels also use less metal and provide for less capacitance, power dissipation, and setup and hold time variation. Moreover, with the short routes in a die-to-die interface, transmission line effects (e.g., reflections from impedance discontinuities) may be negligible, and the total three-section physical path for a data bit or the clock may appear substantially as a lumped point load in some embodiments. Such feature allows the three-section physical path to be impedance-matched.

Figure 3:
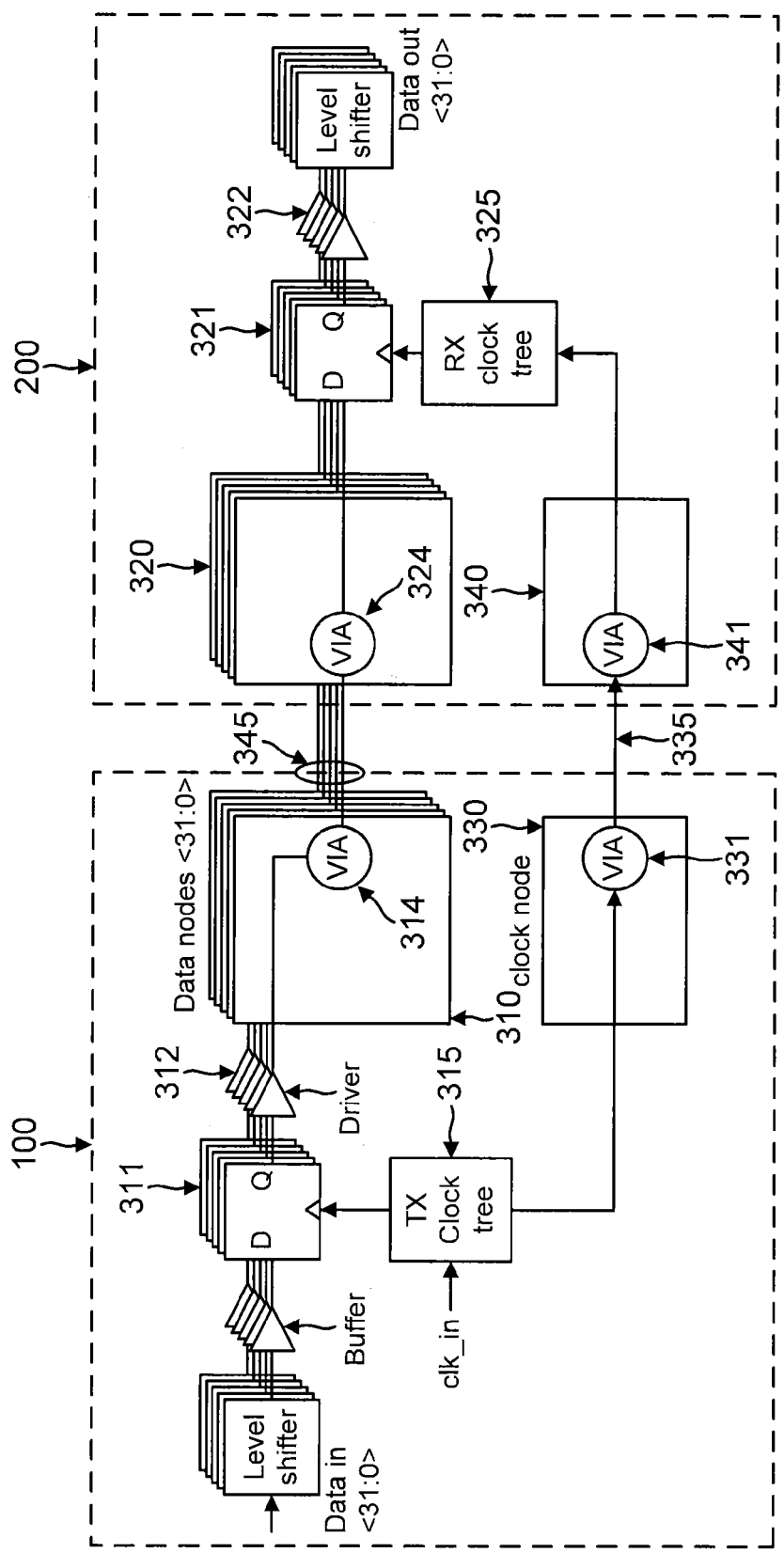
FIG. 3 shows a functional view of an example die-to-die interface, according to one embodiment of the present disclosure.

FIG. 3 shows a functional view of an example die-to-die interface, which may be used with die-to-die subsystems 100 and 200 of FIGS. 1 and 2, according to one embodiment of the present disclosure.

Die-to-die subsystem 100 includes data nodes 310 and clock node 330. In this example, data nodes 310 includes thirty-two data nodes (<31:0>) arranged as shown in FIG. 1. Clock node 330 corresponds to clock node 155 of FIG. 1. Each of the thirty-two data nodes are associated with a bit of data. The data nodes 310 and the clock node 330 of FIG. 3 are another way of illustrating the bits and nodes of a die in the examples of FIGS. 1 and 2.

Clock node 330 is used to forward the clock from die 1 to die 2, as explained in more detail above. In this example, the clock is in communication with via 331, which is externally-exposed at die 1, and propagates over die-to-die clock route 335 to via 341 at clock node 340. Clock node 340 is another way of illustrating clock node 255 of FIG. 2.

Die-to-die subsystem 100 includes transmit clock tree 315, which is shown conceptually in FIG. 3, but is understood to correspond to clock tree 150 of FIG. 1. Transmit clock tree 315 includes buffers to receive the clock (from clk_in) and metal routes to flip-flops 311 (of which flip-flop 131 is an example). Drivers 312 include as an example driver 121 of FIG. 1. While no specific topological arrangement of the transmit clock tree 315 is shown in FIG. 3, it is understood that tree 315 would have an architecture according to the principles described above with respect to FIGS. 1 and 2.

Similarly, receive clock tree 325 includes buffers to receive the clock from clock node 340 and metal routes to distribute the clock to flip-flops 321 (of which flip-flop 231 is an example). Data nodes 320 have thirty-two nodes in this example, of which data node 201 is included. Each of the nodes corresponds to one of the nodes of data nodes 310. Consistent with the examples of FIGS. 1 and 2, data nodes 310 and 320 are arranged in a spatial pattern such that a pair of corresponding nodes (one a transmit node and one a receive node) are similarly placed upon their respective die. Thus, each of the thirty-two data forwarding channels 345 are uniform in length (and match a length of clock forwarding route 335).

Returning to die-to-die subsystem 100, the clock is distributed by transmit clock tree 315 to the flip-flops 311. Each data node 310 in this example is in communication with one of the flip-flops 311, which are storing data. When a given flip-flop 311 receives the clock edge it forwards the data to its respective data node and via 314. The data is then transported on a respective data forwarding route 345 to its corresponding node within data nodes 320. The data is received by a respective via 324 and is captured by its respective flip-flop 321 at the clock edge. This process is the same as that described above with respect to FIGS. 1 and 2.

The examples of FIGS. 1-3 above are provided for illustrative purposes, and it is understood that the scope of embodiments is not limited to the specific embodiments shown above. For instance, die may be adapted to serve any appropriate number of nodes (whether thirty-two, fifty, or another number). Also, the flip-flops at the nodes may operate on either a rising or falling clock edge, as appropriate. Furthermore, while FIG. 3 shows flip-flops, any appropriate sequential logic circuit may be used in various embodiments.

The die referred to above (and including the die-to-die subsystems) of FIGS. 1-3 may be included in a multi-die package. FIG. 4 shows one example multi-die package adapted according to one embodiment, which may accommodate die.

FIG. 4 includes two views 410 and 420. View 410 is a side view of package 400, which includes die 1 and die 2. In this example, die 1 and die 2 represent die with any appropriate number of externally-exposed contacts. The concepts described here with respect to die 1 and die 2 apply to the die that include die-to-die subsystems 100 and 200 of the examples above, as well as to any other appropriate die. View 420 is a cut-away view of a portion of interposer 402 that serves die 1.

Focusing on view 410, die 1 and die 2 are in communication with each other by data and clock forwarding routes (not shown) as explained in more detail above. Die 1 and 2 are also in communication with solder balls on an external surface of package 400. One example solder ball 403 is marked in view 410, and view 410 shows nine solder balls in this side view. Die 1, die 2, and interposer 402 are encapsulated in package 400 according to any appropriate packaging technique now known or later developed. The scope of embodiments is not limited to any particular packaging techniques.

View 420 shows a cross section of a portion of interposer 402. Solder balls 422 correspond to two of the solder balls shown in view 410 (e.g., solder ball 403). Balls 422 are in communication with metal layers M1 and M2 by through silicon vias (TSVs) 423. Structures 424 are in communication with metal layers M1 and M2 as well as with data and/or clock nodes of the die 1 and 2. Thus, the interposer 402 provides for communication between the die and the solder balls and for communication between the die themselves. For example, the metal layer M1 may be used to provide communication between the die, where communication between the die includes the data forwarding routes and the clock forwarding routes of FIG. 3.

FIG. 5 is an illustration another example multi-die package 500, adapted according to one embodiment. The concepts described here with respect to die 1 and die 2 apply to the die that include die-to-die subsystems 100 and 200 of the examples above, as well as to any other appropriate die. In the example of FIG. 5, die 1 and die 2 are disposed upon semiconductor substrate 516, and the package is grown upon die 1, die 2, and substrate 516 using appropriate semiconductor manufacturing processes. For instance, layers of dielectric are grown, then partially etched away to accommodate deposition of metal layers. Metal layers M1, M2, and M3 are shown in FIG. 5, and it is understood that metal layers M1, M2, and M3 are built upon layers of dielectric. After the dielectric layers and metal layers are formed, solder balls 525 and 526 are formed on the exterior surface of the package. The package thus includes die 1, die 2, multiple dielectric and metal layers, and external solder balls.

Package 500 differs from package 400 (FIG. 4) in that the package is "grown" upon die 1 and 2 using semiconductor manufacturing processes (e.g., deposition, etching, sputtering, etc.) rather than being assembled from multiple separate parts that are encapsulated together using traditional packaging techniques (e.g., adhesives and the like).

In this example, die 1 includes nodes 511, 512, and die 2 includes nodes 521, 522. Data nodes 512 and 522 are data nodes (e.g., like individual ones of the nodes 310 and 320 of FIG. 3) that share data using metal data route 515 (an example type of the die-to-die data channel). Nodes 511 and 521 are in communication with solder balls 525 and 526, respectively, through metal layers M1-M3. Clock trees are not shown explicitly in the embodiment of FIG. 5, but it is understood that the clock trees can be formed in any of metal layers M1, M2, or M3.

FIG. 5 is for example only, and it is understood that other embodiments may include many more metal layers and many more solder balls in a particular package. Also, packages may include more than two die.

Various embodiments may provide one or more advantages for package designs. For instance, when it is known beforehand which die are to be placed in a package, data and clock channels such as those of FIGS. 1 and 2 may be implemented to distribute data and clocks to the nodes of a given die and also die-to-die. This is because the die can be designed together with a layout that allows matched insertion delays for corresponding nodes of the two die. The package can further be designed to place the die in proximity to each other to allow for short and uniform data and clock forwarding routes between corresponding nodes. Thus, in a die-to-die interface where the placement of both die in a package is known beforehand, some embodiments may have the added flexibility of building a die-to-die link that can tolerate some clock skew in exchange for benefits, such as short data and clock forwarding routes using less metal and less power.

Various embodiments may also provide another advantage. As noted above, some embodiments localize the placement of the sequential logic and clock trees to a particular side of the array of contacts. By localizing the die-to-die circuitry in Die1 and Die2, as opposed to distributing the circuitry across the contacts, the design less is less dependent on the technology implementing the circuitry. As an illustration, a cost-saving opportunity of some die-to-die implementations is that Die1 can be implemented in a different technology than Die2, where the respective technologies are just good enough to satisfy performance requirements of Die1 and Die2 sub-systems. In an example where Die1 is built in 10 nm CMOS while Die2 is built in 28 nm CMOS, the area used to build the circuitry in Die2 will likely be substantially larger than that in Die1. By placing the die-to-die circuitry to a side of the array of contacts (as described above with respect to FIGS. 1 and 2), the area density of the contacts is no longer potentially constrained by the circuitry area of the older technology, but simply constrained by the common package technology that integrates Die1 and Die2. Thus, some embodiments may provide for a more flexible design.

FIG. 6 is an illustration of an example die-to-die interface, adapted according to one embodiment. Specifically, FIG. 6 shows an example die-to-die data routing pattern that may be used with any of the embodiments described above. Die 1 and die 1 each include a three-by-three array of nodes spatially placed so that similarly positioned nodes on each die correspond to each other. For example, node 601a corresponds to node 602a, node 601b corresponds to node 602b, and node 601c corresponds to node 602c. The other six nodes on each die correspond similarly.

Nodes 601a and 602a are in communication through data channel 603a, nodes 601b and 602b are in communication through data channel 603b, and nodes 601c and 602c are in communication through data channel 603c. The other six corresponding pairs are also in communication similarly. Of note is that each of the data channels 603a-c, and the other unlabeled data channels, are uniform in length. Thus, each corresponding pair of nodes has substantially the same delay in communicating information from die 1 to die 2. Although not shown in FIG. 6, it is understood that a clock channel may also be used that is substantially the same length as the data channels. The scope of embodiments is not limited to any particular number of nodes on a die or number of corresponding pairs, as the three-by-three array of FIG. 6 is an example.

Example methods of use for the circuits of FIGS. 1-6 will now be discussed.

Example Methods of Use

Figure 7:
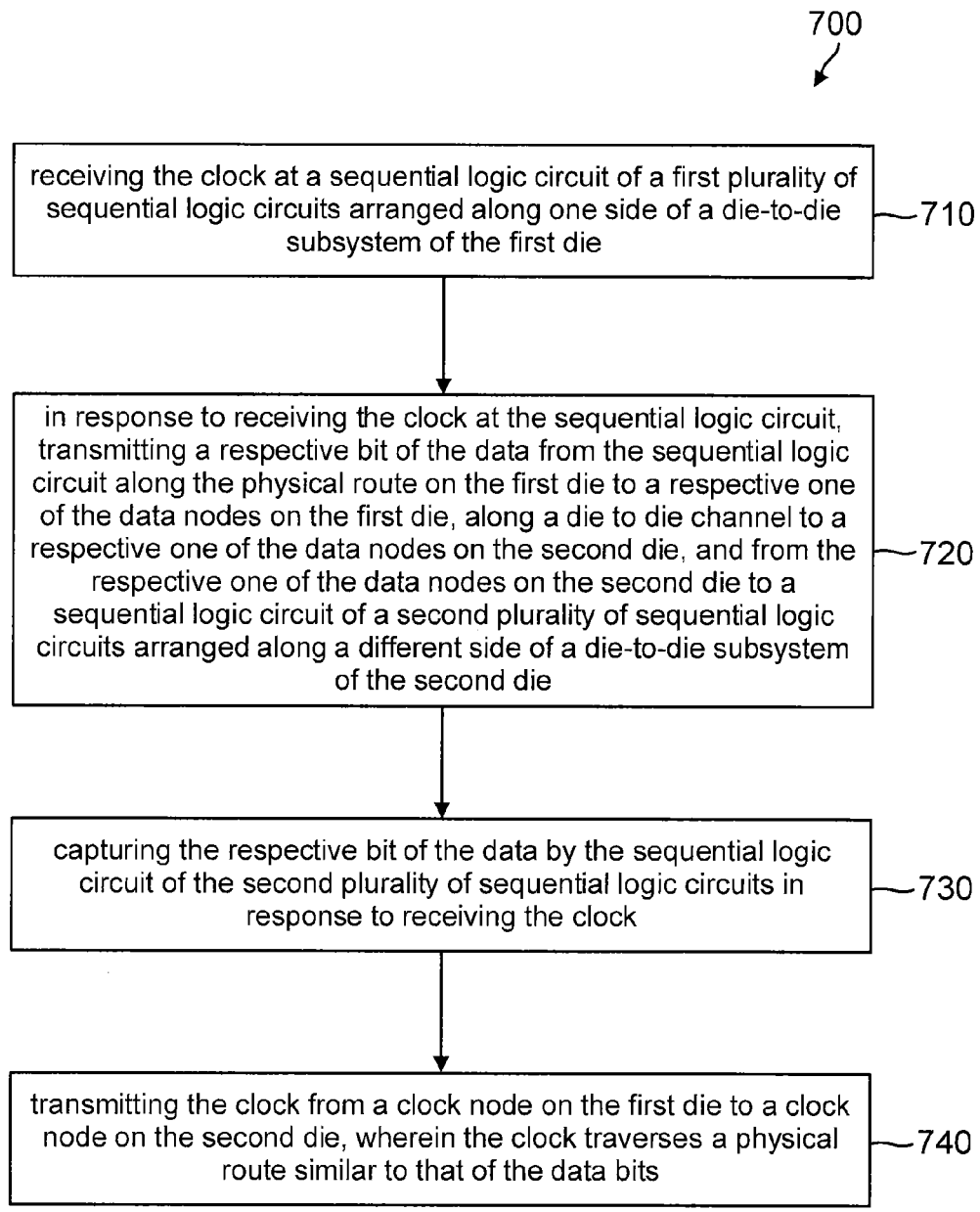
FIG. 7 is a flow diagram for an example method of distributing clock signals at a die-to-die interface, according to one embodiment.

FIG. 7 is a flow diagram for an example method 700 of providing data and clock signals at a die-to-die interface, according to one embodiment. The method 700 may be performed by the die shown in FIGS. 1-6. In the example method 700, the actions are performed with respect to the circuit layout shown in FIGS. 1 and 2. Specifically, each die-to-die subsystem includes an array of data nodes at least one clock node, and each of the die-to-die subsystems arranges its data nodes in the array in the same way. One die places its clock tree and sequential logic circuits along one side of its array of data nodes and die-to-die subsystem. The other die places its clock tree and sequential logic circuits along another side of its array of data nodes and die-to-die subsystem, where each of the die uses a different side. For example, the two die may use a right-hand versus left-hand relationship for placement of the clock trees and sequential logic circuits.

Thus, consistent with FIGS. 1 and 2, a corresponding pair of nodes includes a transmit node and a receive node that handle the same bit of data from die-to-die. Both the transmit node and the receive node are positioned spatially within their respective node arrays substantially the same.

Furthermore, for each bit of data an on-die data route for the first die has a length that is complemented by the length of an on-die data route for the second die. A relatively long length for an on-die data route is complemented by a relatively short length for an on-die data route on the other die. A sum of on-die data routes for a given bit for both of the die is substantially equal for each of the bits. As a result, propagation delay attributed to the on-die data routes should be substantially the same for each of the bits as well. A clock path includes on-die clock routes that sum to be approximately the same as that of the data routes.

A data input receives parallel binary data on the first die and passes that parallel binary data to sequential logic circuits, for example flip-flops, on the first die. The actions described below at blocks 710-730 are performed for each one of the bits of parallel binary data.

The method begins at block 710, which includes receiving the clock at a sequential logic circuit arranged along one side of a die-to-die subsystem of the first die. Each of the bits is associated with a respective sequential logic circuit, and each of the sequential logic circuits receive the clock.

At block 720, the sequential logic circuit, in response to receiving the clock, transmits its bit of data along a physical route on the first die to a respective one of the data nodes on the first die, along a die-to-die channel to a data node on the second die, and from the data node on the second die to a sequential logic circuit arranged along a side of a die-to-die subsystem of the second die. In some embodiments, each bit traverses a uniform length sum for the on-die physical routes, and the die-to-die data channels are substantially uniform in length as well.

At block 730, in response to receiving the clock the sequential logic circuit of the second die captures the bit of the data. The actions of blocks 710-730 are exemplified by the circuits of FIGS. 1 and 2 as the parallel data bits are forwarded from the transmit flip-flops over physical data paths, including on-die and die-to-die paths, to receive flip-flops on the other die. As noted above, the physical data paths are similar for each bit of data, and thus each bit of data experiences a similar propagation delay.

At block 740, the clock is transmitted from a clock node on the first die to a clock node on the second die. The clock signal traverses a physical route similar to that traversed by each of the data bits.

In the examples of FIGS. 1 and 2, the clock is received at the transmit (first) clock tree and then is forwarded to the receive (second) clock tree over a clock forwarding channel. Thus, the clock at the receive clock tree arrives after a short delay that is additive to any insertion delay at the receive tree itself. In some embodiments, corresponding flip-flops on each of the die (in other words a transmit flip-flop and a receive flip-flop handling the same bit of data) experience a same clock-tree-attributable insertion delay, so that the delays attributable to the clock trees are canceled out.

The scope of embodiments is not limited to the specific method shown in FIG. 7. Other embodiments may add, omit, rearrange, or modify one or more actions. For instance, the actions of blocks 740, in which the clock is transmitted from die-to-die, is performed as the data bits are transmitted from die-to-die. In other words the arrangement of blocks in method 700 is not limited to a specific order of actions. Also, in many real-world applications, the actions of blocks 710-740 are performed continuously as the die transfer digital bits of information therebetween, perhaps millions or billions of times a second.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising:
    a first die having a first array of exposed data nodes; and
    a second die having a second array of exposed data nodes, wherein a given data node of the first array corresponds to a respective data node on the second array, further wherein the first array and the second array share a spatial arrangement of the data nodes;
    wherein the first die has data inputs and sequential logic circuits for each of the data nodes of the first array on a first side of the first array, and wherein the second die has data outputs and sequential logic circuits for each of the data nodes of the second array on a second side of the second array, the first and second sides being different.

2. The circuit of claim 1, wherein corresponding ones of the data nodes are coupled across the die by die-to-die data channels, wherein the die-to-die data channels are a uniform length.

3. The circuit of claim 1, further comprising a first clock tree configured to feed the sequential logic circuits of the first die, and a second clock tree configured to feed the sequential logic circuits of the second die.

4. The circuit of claim 3, wherein the first clock tree is in contact with an exposed clock node on the first die, the exposed clock node on the first die coupled to a die-to-die clock channel in communication with an exposed clock node on the second die, further wherein the exposed clock node on the second die is in communication with the second clock tree.

5. The circuit of claim 1, wherein a given data node on the first die and its corresponding data node on the second die are associated with a respective data bit.

6. The circuit of claim 5, wherein a path for a given data bit comprises:
    a physical route from a respective flip-flop on the first die to a respective data node on the first to die, a die-to-die channel, and a physical route from a respective data node on the second die to a respective flip-flop on the second die, and further wherein paths for each of the data bits in the circuit are substantially equal in length.

7. The circuit of claim 1, further comprising a first clock tree configured to feed the sequential logic circuits of the first die, and a second clock tree configured to feed the sequential logic circuits of the second die, wherein a path for the clock comprises:
    a physical route from the first clock tree to an exposed clock node on the first die, a die-to-die clock channel from the exposed clock node on the first die to an exposed clock node on the second die, and a physical route for the exposed clock node on the second die to the second clock tree, further wherein the path for the clock is substantially equal in length to lengths of data channels for a plurality of bits of the circuit.

8. The circuit of claim 1, wherein the first and second die are disposed in a multi-die package, the package comprising:
    a substrate upon which the first and second die are disposed;
    a plurality of metal layers configured to provide electrical communication between the first and second die and with external pins of the package; and
    dielectric layers grown over the first and second die.

9. The circuit of claim 1, wherein the first and second die are coupled with each other through an interposer, further wherein the first and second die and the interposer are included in a multi-die-package.

10. A method comprising:
providing parallel binary data to a plurality of data nodes on a first die and to a plurality of data nodes on a second die, wherein individual ones of the plurality of data nodes on the first die correspond to respective ones of the data nodes on the second die, and wherein each of the data nodes on the first die is associated with a bit of the parallel binary data; and
for each one of the bits of the parallel binary data:
receiving the clock at a sequential logic circuit of a first plurality of sequential logic circuits arranged along one side of a die-to-die subsystem of the first die;
in response to receiving the clock at the sequential logic circuit, transmitting a respective bit of the data from the sequential logic circuit along a physical route on the first die to a respective one of the data nodes on the first die, along a die-to-die channel to a respective one of the data nodes on the second die, and from the respective one of the data nodes on the second die to a sequential logic circuit of a second plurality of sequential logic circuits on the second die, wherein the second plurality of sequential logic circuits is arranged along one side of a die-to-die subsystem of the second die that is different from the one side of the die-to-die subsystem of the first die; and
capturing the respective bit of the data by the sequential logic circuit of the second plurality of sequential logic circuits in response to receiving the clock.

11. The method of claim 10, wherein corresponding ones of the data nodes are coupled by conductive data channels that have a uniform length.

12. The method of claim 11, further comprising:
transmitting the clock from a clock node on the first die to a clock node on the second die, wherein a die-to-die channel between the clock node on the first die to the clock node on the second die has the uniform length.

13. The method of claim 10, wherein the bits of parallel data traverse a plurality of physical paths from the first plurality of sequential logic circuits to the second plurality of sequential logic circuits, wherein the plurality of physical paths are substantially equal in length.

14. The method of claim 13, wherein the clock signal propagates from a clock tree on the first die to a clock tree on the second die on a physical path that has a length substantially equal to that of individual ones of the plurality of physical paths.

15. The method of claim 10, wherein the bits of parallel data traverse a plurality of on-die data routes from the first plurality of sequential logic circuits to the second plurality of sequential logic circuits, wherein a length sum of on-die data routes for each bit is substantially the same.

16. The method of claim 10, wherein receiving the clock at the sequential logic circuit of the first plurality of sequential logic circuits comprises:
receiving the clock from a clock tree of the first die, the clock tree being arranged along the one side of the die-to-die subsystem of the first die.

17. The method of claim 10, wherein the first plurality of data nodes conform to a spatial arrangement upon the first die, and wherein the second plurality of data nodes conform to a same spatial arrangement upon the second die.

18. The method of claim 10, wherein the first die and the second die are included in a same multi-die package.

19. A multi-die package comprising:
a first die having a first clock tree feeding a first plurality of flip flops, the first die further having a first array of exposed data nodes, wherein individual ones of the first plurality of flip-flops correspond to individual ones of the first array of exposed data nodes; and
a second die having a second clock tree feeding a second plurality of flip flops, the second die further having a second array of exposed data nodes, wherein individual ones of the second plurality of flip-flops correspond to individual ones of the second array of exposed data nodes;
wherein individual ones of the first plurality of exposed data nodes correspond to, and are in communication with, individual ones of the second plurality of exposed data nodes to pass a plurality of parallel data bits, the first array of exposed data nodes and the second array of exposed data nodes conforming to a common spatial arrangement of data nodes;
further wherein the first plurality of flip-flops is disposed on a first side of the first array, and the second plurality of flip-flops is disposed on a second side of the second array, the first and second sides having a right-hand versus left-hand relationship.

20. The multi-die package of claim 19, wherein individual ones of the first plurality of exposed data nodes are connected across the die by data channels to corresponding individual ones of the second plurality of exposed data nodes, wherein the data channels are of a uniform length.

21. The multi-die package of claim 19, wherein the first plurality of flip-flops and the second plurality of flip-flops receive a same clock.

22. The multi-die package of claim 21, wherein the clock is forwarded from the first die to the second die along a physical path having a die-to-die length substantially the same as a die-to-die length traversed by each bit of the plurality parallel data bits.

23. The multi-die package of claim 19, wherein each bit of the plurality of parallel data bits traverses a first on-die data route from its respective flip-flop to its respective exposed data node on the first die and traverses a second on-die data route from its respective exposed data node on the second die to its respective flip-flop on the second die, the first and second data routes having different lengths, further wherein a length sum of the first data route and the second data route is uniform for each bit of the plurality of parallel data bits.

24. The multi-die package of claim 19, wherein the first clock tree is disposed on the first side of the first array, and the second clock tree is disposed on the second side of the second array.

25. The multi-die package of claim 19, wherein the multi-die package further comprises:
a substrate upon which the first and second die are disposed;
a plurality of metal layers configured to provide electrical communication between the first and second die and with external pins of the package; and
dielectric layers grown over the first and second die.

26. The multi-die package of claim 19, wherein the multi-die package further includes:
an interposer configured to provide electrical communication between the first and second die and with external pins of the package.

27. A method for providing parallel data bits in a multi-die package having a first die in communication with a second die, the method comprising:

providing parallel binary data to a plurality of transmit flip-flops on the first die;

transmitting the parallel binary data from the plurality of transmit flip-flops to a plurality of receive flip-flops on the second die; and capturing the parallel data at the plurality of receive flip-flops;

wherein transmitting the parallel binary data comprises, for each individual bit of the parallel data:

propagating the bit of data on the first die along a first on-die data route; and propagating the bit of data on the second die along a second on-die data route, wherein the first on-die data route and the second on-die data route have different lengths;

wherein a length sum of the first on-die data route and the second on-die data route is uniform for each bit of the parallel data.

28. The method of claim 27, further comprising for each individual bit of the parallel data:

transmitting the bit across a die-to-die data channel, wherein a length of the die-to-die data channel is uniform for each bit of the parallel data.

29. The method of claim 27, further comprising:

transmitting a clock signal from a clock tree feeding the plurality of transmit flip-flops through a die-to-die clock channel to a clock tree feeding the plurality of receive flip-flops.

30. The method of claim 29, wherein transmitting the clock signal comprises:

propagating the clock signal along a physical path that is substantially the same length as a physical path traversed by each individual bit of the parallel data from its respective transmit flip-flop to its respective receive flip-flop.

* * * * *